(Model.)

3 Sheets—Sheet 1.

A. B. PIXLEY.
COMBINED RAKE AND TEDDER.

No. 271,265. Patented Jan. 30, 1883.

Witnesses:
Palmer C. Ricketts
James O'Sullivan

Inventor:
A. B. Pixley
Per. Geo. A. Mosher
Atty.

(Model.)

3 Sheets—Sheet 2.

A. B. PIXLEY.
COMBINED RAKE AND TEDDER.

No. 271,265. Patented Jan. 30, 1883.

Witnesses:

Palmer C. Ricketts
James O'Sullivan

Inventor:

A. B. Pixley
Per. Geo. A. Mosher
Atty.

(Model.)
3 Sheets—Sheet 3.
A. B. PIXLEY.
COMBINED RAKE AND TEDDER.
No. 271,265. Patented Jan. 30, 1883.
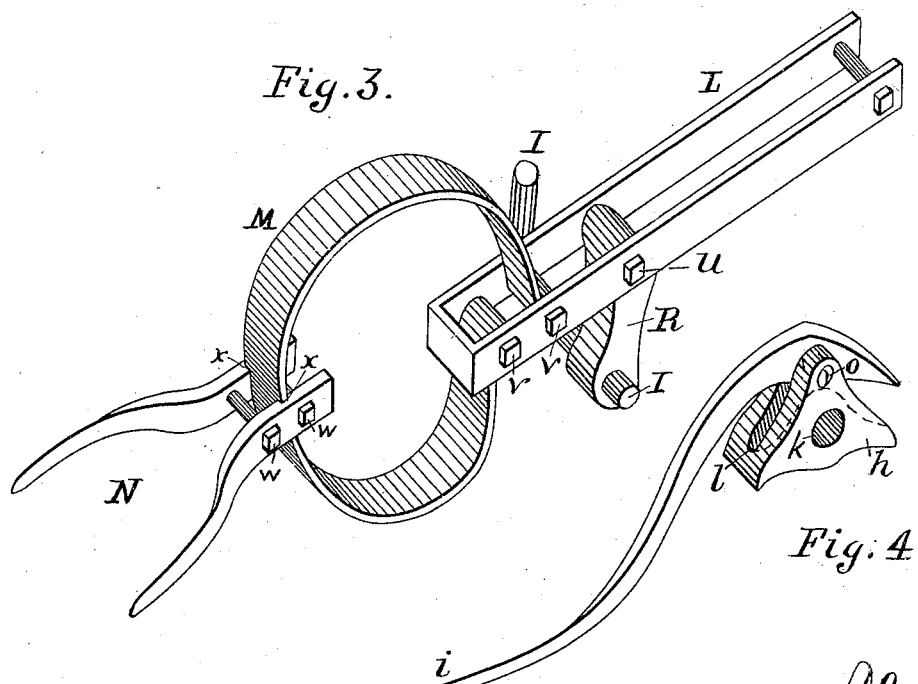
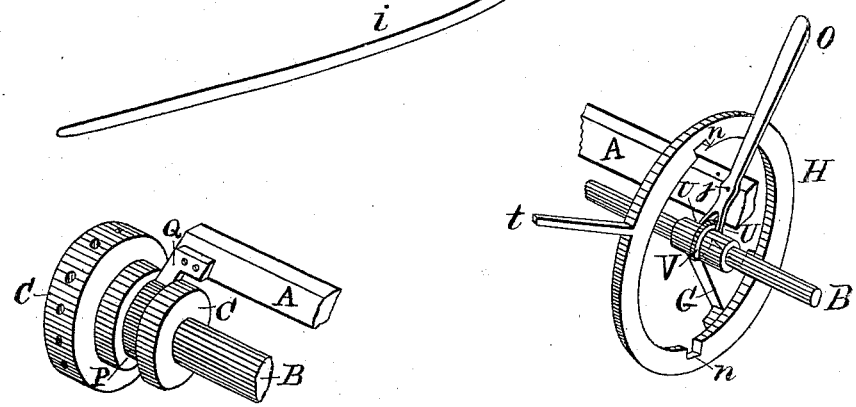
Witnesses:
W. W. Rousseau
Edwin K. King
Inventor·
Albert B. Pixley
Per Geo. A. Mosher Atty.

UNITED STATES PATENT OFFICE.

ALBERT B. PIXLEY, OF ROYALTON, VERMONT.

COMBINED RAKE AND TEDDER.

SPECIFICATION forming part of Letters Patent No. 271,265, dated January 30, 1883.

Application filed October 18, 1880. (Model.)

*To all whom it may concern:*

Be it known that I, ALBERT B. PIXLEY, of the town of Royalton, county of Windsor, and State of Vermont, have invented a new and useful Improvement in Horse-Rakes and Hay-Tedders Combined; and I hereby declare that the following is a full, clear, and exact description thereof, reference being had to the accompanying drawings through letters of reference marked thereon, forming part of this specification.

The object of my invention is to combine a horse-rake with a hay-tedder in such a manner that both may be permanently attached to the same two-wheeled carriage, either being easily and quickly swung to and securely held in a position such as to permit of the free and uninterrupted use of the other.

Figure 1:
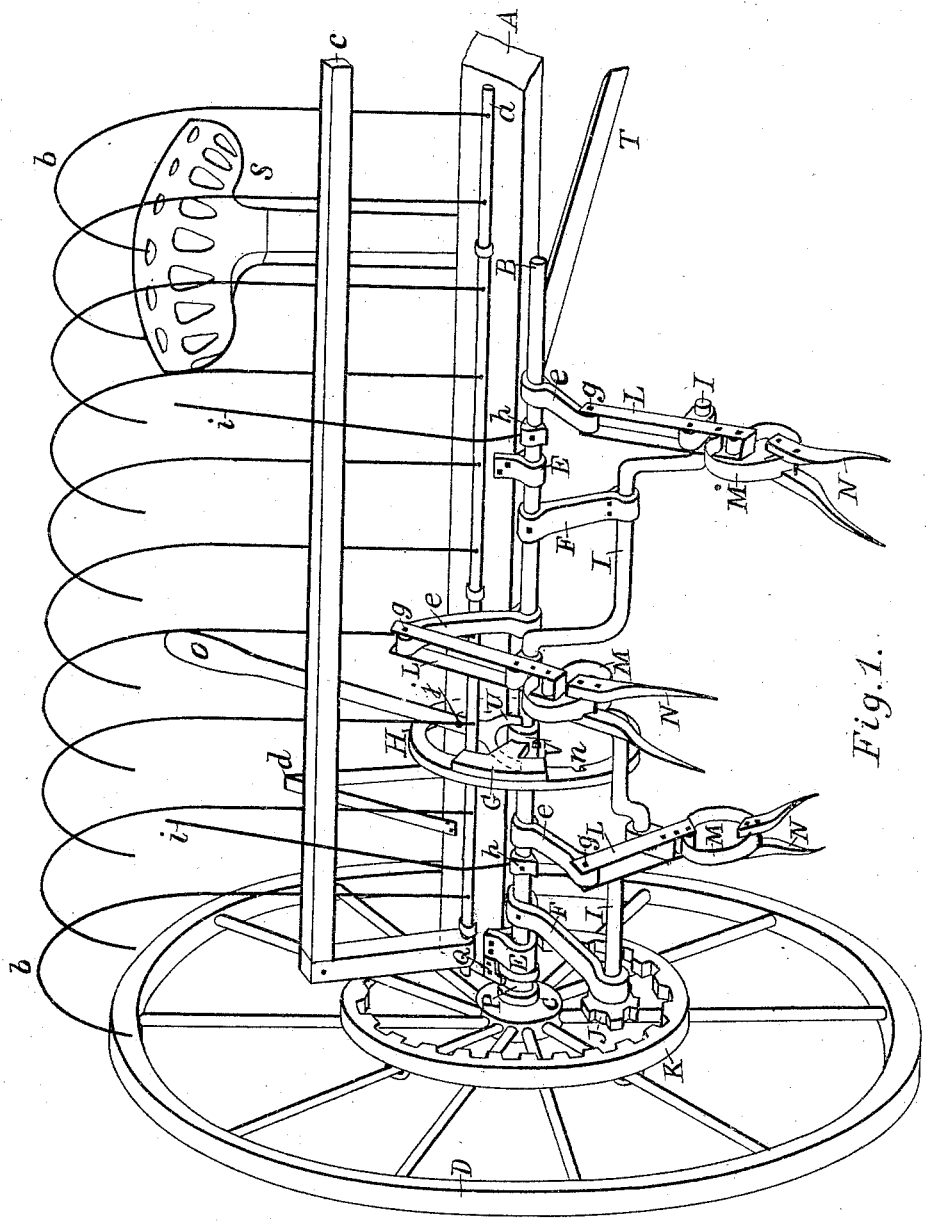
Figure 2:
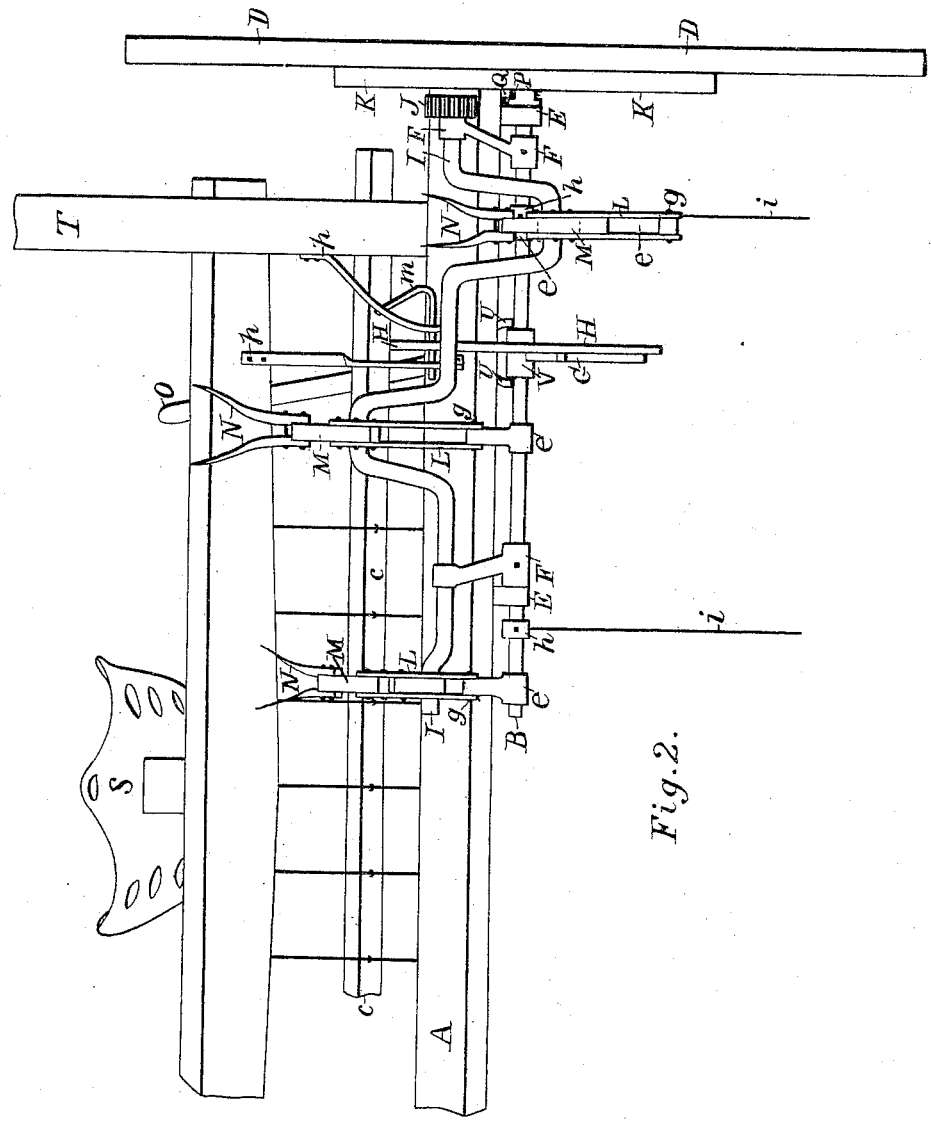

Figure 1, Sheet 1, represents in perspective a rear view of one section or half of the whole machine, showing the tedder in position for work and the rake swung up. The other section or half is precisely the same, each section acting independently of the other, having its own driving-wheel D, for which reason only one section is shown. Fig. 2, Sheet 2, represents in elevation a front view of the same section with the tedder-forks swung up to the front out of the way of the rake. The rake is also shown swung up, as the thills are elevated to facilitate the view of the different parts. Fig. 3. Sheet 3, shows in perspective an improved method of attaching the tedder-forks to the vibrating arms. Fig. 4, Sheet 3, is a perspective of the hay-stops used with the rake. Fig. 5, Sheet 3, shows in perspective an improved method of securing the carriage-wheels upon their axles. Fig. 6, Sheet 3, represents in detailed perspective the levers employed to throw the tedder-forks in and out of position, as well as in and out of gear.

The same letters indicate like parts in all the figures.

A is a carriage or rake-frame, which connects two carriage-wheels, D, and supports the rod *a*, provided with the movable curved rake-teeth *b*, secured thereto at one end. The teeth are fastened to or pass through the cross-bar *c*, by means of which bar their free ends are maintained in a uniform position and can all be raised or lowered at once by raising or dropping the bar. The cross-bar and rake-teeth are held in the position shown in Fig. 1 by brace *d*, which catches and holds a suitable spring-hook (not shown) attached to the cross-bar *c*. When the rake-teeth are swung up into this position there is ample room below for the tedder-forks to do their work.

B is a revolving and sliding shaft, passing through the hub C of the wheel D, one end of the shaft serving as an axle on which the wheel revolves. This shaft is adapted to revolve and slide in the boxes or loops E, which are attached to rake-frame A, while the shaft itself supports the radial arms F, firmly attached thereto by set-screws or otherwise. There is also attached to said shaft the arm or lever G, which supports at one end the hoop H, provided with the handle *t*, by means of which the shaft may be rotated in either direction. The radial arms F support in boxes at their ends remote from the shaft B the crank-shaft I, which revolves therein.

The crank-shaft is provided at the end next its wheel D with the fixed pinion J, which is actuated when in gear by the cogged wheel K, firmly attached to the spokes of wheel D. The crank-shaft, with its pinion J, is slid endwise in and out of gear by means of the lever O, fulcrumed at *j* upon frame A, and provided with the prongs *b b*, which engage the flange V on lever G, attached to shaft B, as shown more fully in Fig. 6, Sheet 3, the shaft B carrying with it the radial arms F F, which support and carry with them the crank-shaft and pinion. When the crank-shaft and pinion are thus thrown into gear with cogged wheel K, and the machine driven forward, the drive-wheel D, by its traction upon the ground, imparts a rapid revolving motion to crank-shaft I, which supports upon each crank an arm, L.

The arm carries at one end a tedder-fork, and the other end unites with one end of the arm *e* to form the elbow-joint *g*, while the other end of arm *e* is looped and easily turns upon shaft B. A backward and upward motion is thus given the forks adapted to throw up and scatter mown grass or hay.

In order to give flexibility to the forks in case they strike the ground or other obstacle, and to give a quicker throw to the hay or grass, the forks are attached to the arm by means of the circular spring M. (Shown in detail in Fig. 3, Sheet 3.) The spring is provided with looped ends adapted to receive the bolts $v\ v$, which pass through the end of the arm L. The fork N, which is composed of two separated prongs with grooves $x\ x$ adapted to receive the edges of the spring, is secured to the spring at a point about midway between its ends by the bolts $w\ w$ passing through the prongs—one on each side of the spring—as shown in said Fig. 3. In the same figure R is a short connecting-link, secured at one end to arm L by bolt $u$, the other end being provided with a suitable box for receiving the bearing of the crooked revolving shaft I.

Fig. 5, Sheet 3, shows in detail my improved method of securing the carriage-wheels upon their axles. Shaft B, which also serves as an axle, slides freely through the wheel-hub C. The hub is provided with the groove P, adapted to receive the projection Q, attached to frame A; and as the position of the axle or shaft B is regulated by the lever O, also attached to frame A, the hub C is prevented from sliding off its axle B.

The operation of the combined parts may be briefly reviewed as follows: When it is desired to use the tedder for stirring up hay or grass, the rake is first raised from the ground and secured to braces $d$. Then the shaft B, with the radial arms F, which support the crank-shaft I and tedder-forks N, is revolved to the position shown in Fig. 1, Sheet 1, by means of the lever G, provided with the hoop or circle H, having the notches $u$ and handle $t$, Figs. 6, 1, and 2, and held therein by means of the spring-stop $m$, Fig. 2, adapted to fit into said notches and supported by the braces $p$.

When it is desired to use the rake, the shaft B is first slid in a direction away from the wheel by lever O, which movement throws pinion J out of gear. The shaft B is then revolved by lever G, provided with handle $t$, until the forks N are brought forward into the position shown in Fig. 2, Sheet 2, and held therein by means of the other notch, $n$, and spring-stop $m$. Then the rake may be released from the brace $d$ and lowered until the teeth $b$ rest upon the ground, when it is ready for use, the tedder-forks being entirely out of the way.

The stops $i$ are used only in connection with the rake, and are shown in detail in Fig. 4, Sheet 3. They are hung loosely near one end to a block, $h$, by bolt $o$. The block $h$ is provided with the hole K, through which the shaft B passes, and is fastened tightly thereto by a set-screw. It is also provided with the groove $l$, adapted to receive the stop $i$. When the rake is in use and shaft B turned to hold the tedder-forks in front or forward of said shaft, out of the way of the rake, the block $h$ presses the short end of the stop, which lies partly buried in the groove $l$, against the bottom of the frame A, and holds the stop in a horizontal position when the carriage-thills are in a horizontal position, as they are when in use, where it stops the hay when the rake is elevated for the purpose of dumping the hay. When the tedder is brought into position for use, the shaft B, and consequently the block $h$, is revolved through more than a quarter of a circle, and the longer end of the stop drops into the groove $l$, and is held in a perpendicular position against the rake by the block $h$, which presses against it, and the stop has traveled through only a quarter of a circle, to which distance it is limited by the presence of the rake.

What I claim as new, and desire to secure by Letters Patent, is—

1. A revolving and sliding shaft, B, provided with a lever, G, and radial arms F, adapted to carry a revolving crank-shaft, I, in combination with rake-frame A, provided with lever O, adapted to slide the shaft B back and forth, as described, and for the purposes set forth.

2. A wheel, D, provided with grooved hub C, in combination with axle B and frame A, provided with rake-teeth $b$, and flange Q, adapted to fit into the groove P of said hub, as described, and for the purposes set forth.

3. A circular spring, M, supported at its ends on the arm L, in combination with tedder-fork N, attached to and supported by the spring at a point between the ends of the spring, as described, and for the purposes set forth.

4. The hay-stop $i$, adapted to turn with revolving shaft B, in combination with frame A, provided with rake-teeth $b$, as described, and for the purposes set forth.

ALBERT B. PIXLEY.

Witnesses:
DAVID N. FLANDERS,
D. W. COURLERY,
CLARA C. BOSWORTH.